(12) United States Patent
Tanaka

(10) Patent No.: US 9,322,739 B2
(45) Date of Patent: Apr. 26, 2016

(54) EYEGLASS LENS MEASURING APPARATUS, METHOD FOR DISTINGUISHING UPPER PORTION FROM LOWER PORTION OF EYEGLASS LENS, AND POINT MARKING ADAPTER

(71) Applicant: NIDEK CO., LTD., Aichi (JP)

(72) Inventor: Motoshi Tanaka, Aichi (JP)

(73) Assignee: NIDEK CO., LTD., Aichi (JP)

( * ) Notice: Subject to any disclaimer, the term of this patent is extended or adjusted under 35 U.S.C. 154(b) by 8 days.

(21) Appl. No.: 14/227,669

(22) Filed: Mar. 27, 2014

(65) Prior Publication Data

US 2014/0340673 A1 Nov. 20, 2014

(30) Foreign Application Priority Data

Mar. 29, 2013 (JP) ................................. 2013-074335

(51) Int. Cl.
*G01M 11/02* (2006.01)

(52) U.S. Cl.
CPC .......... *G01M 11/0221* (2013.01); *G01M 11/02* (2013.01); *G01M 11/0214* (2013.01)

(58) Field of Classification Search
CPC .......................... G01M 11/02; G01M 11/0221
USPC .................... 356/124–127, 239.1–239.8, 515
See application file for complete search history.

(56) References Cited

U.S. PATENT DOCUMENTS

| | | | | |
|---|---|---|---|---|
| 790,059 A | * | 5/1905 | Howland .......... | G01M 11/0221 33/547 |
| 1,026,124 A | * | 5/1912 | Richards ........................ | 356/127 |
| 1,929,534 A | * | 10/1933 | Maynard ............. | B24B 13/0055 356/615 |
| 2,917,971 A | * | 12/1959 | Goddu et al. .................... | 33/1 R |
| 4,676,004 A | * | 6/1987 | Nakamura ........ | G01M 11/0214 33/200 |
| 4,730,924 A | * | 3/1988 | Allard et al. ................... | 356/125 |
| 5,173,739 A | * | 12/1992 | Kurachi ............ | G01M 11/0235 356/124 |
| 5,178,800 A | * | 1/1993 | Blum ........................... | 264/1.38 |
| 5,307,141 A | * | 4/1994 | Fujieda ................. | G01M 11/02 356/124 |
| 5,379,111 A | * | 1/1995 | Kajino .............. | G01M 11/0235 356/124 |
| 5,855,074 A | * | 1/1999 | Abitbol ................ | G01B 11/255 33/507 |
| 6,246,644 B1 | * | 6/2001 | Seo ............................. | 369/44.23 |
| 7,532,315 B2 | * | 5/2009 | Song .............................. | 356/124 |
| 8,602,839 B2 | * | 12/2013 | Tanaka et al. ...................... | 451/5 |
| 2008/0149269 A1 | * | 6/2008 | Suzuki .......................... | 156/312 |

(Continued)

FOREIGN PATENT DOCUMENTS

| | | |
|---|---|---|
| JP | 04-273034 | 9/1992 |
| JP | 2006-292650 | 10/2006 |
| JP | 2008-241694 | 10/2008 |

*Primary Examiner* — Tri Ton
*Assistant Examiner* — Jarreas C Underwood
(74) *Attorney, Agent, or Firm* — Rankin, Hill & Clark LLP

(57) ABSTRACT

An eyeglass lens measuring apparatus includes a measuring optical system configured to measure optical properties of an eyeglass lens for the right eye and optical properties of an eyeglass lens for the left eye; and a point marking mechanism including a first point marking member configured to provide a first mark point defining an optical center and an astigmatic axis of the eyeglass lens which are acquired by using the measuring optical system, and a second point marking member configured to provide a second mark point defining an upper portion and a lower portion of the eyeglass lens, wherein the point marking mechanism is configured to provide the eyeglass lens for the right eye and the eyeglass lens for the left eye respectively with the second mark points almost the same in position.

6 Claims, 11 Drawing Sheets

(56) References Cited

U.S. PATENT DOCUMENTS

2008/0192200 A1* 8/2008 Iribarne ............... B24B 9/148 351/159.73

2008/0204727 A1* 8/2008 Kajino ....................... 356/124

2008/0273073 A1* 11/2008 Oakley .................. B41J 2/0057 347/103

* cited by examiner

EYEGLASS LENS MEASURING APPARATUS, METHOD FOR DISTINGUISHING UPPER PORTION FROM LOWER PORTION OF EYEGLASS LENS, AND POINT MARKING ADAPTER

CROSS-REFERENCE TO RELATED APPLICATION

This application claims priority from Japanese Patent Application No. 2013-074335 filed with the Japan Patent Office on Mar. 29, 2013, the entire content of which is hereby incorporated by reference.

BACKGROUND

1. Technical Field

The present invention relates to an eyeglass lens measuring apparatus for measuring optical properties of an eyeglass lens, a method for distinguishing an upper portion from a lower portion of an eyeglass lens, and a point marking adapter.

2. Related Art

A known eyeglass lens measuring apparatus (such as a lens meter) obtains optical properties of a lens by, for example, projecting measurement light flux onto the lens and then receiving the measurement light flux that have passed through the lens with a light receiving device (see JP-A-2006-292650, for example). When the optical properties of the eyeglass lens are measured by such an eyeglass lens measuring apparatus, it is known to implement a so-called point marking operation. In the point marking operation, the lens is provided with mark points for clarifying a measurement location.

The mark points provided by the point marking operation normally include one point on a measurement optical axis, and two points on a line passing the one point, for three points in total. Of those three points, the one at the center mainly indicates the optical center of the lens, while the other two points indicate a reference for an astigmatic axial angle (see FIG. 11).

SUMMARY

An eyeglass lens measuring apparatus includes a measuring optical system configured to measure optical properties of an eyeglass lens for the right eye and optical properties of an eyeglass lens for the left eye; and a point marking mechanism including a first point marking member configured to provide a first mark point defining an optical center and an astigmatic axis of the eyeglass lens which are acquired by using the measuring optical system, and a second point marking member configured to provide a second mark point defining an upper portion and a lower portion of the eyeglass lens, wherein the point marking mechanism is configured to provide the eyeglass lens for the right eye and the eyeglass lens for the left eye respectively with the second mark points almost the same in position.

DETAILED DESCRIPTION

Figure 1:
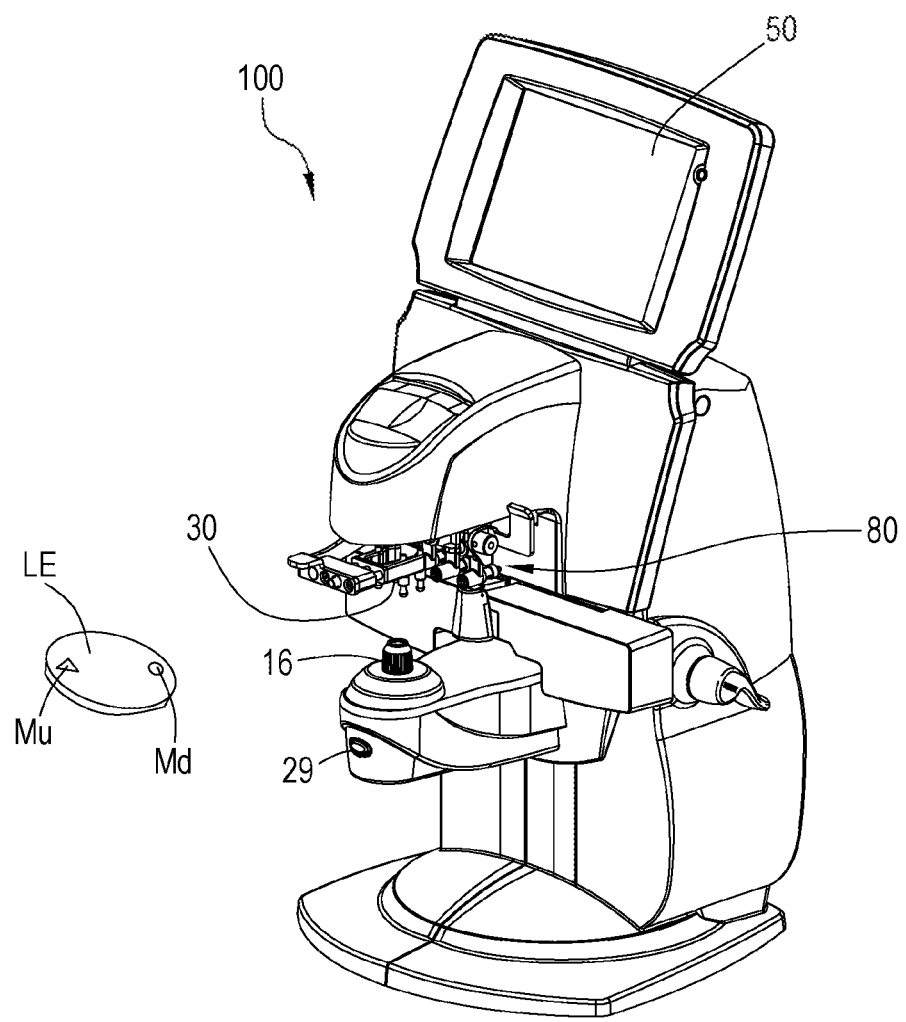
FIG. 1 is an exterior perspective view of a lens meter.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the case of a conventional eyeglass lens, mixing up the upper portion and the lower portion of the eyeglass lens has not been a problem. However, recently, eyeglass lenses that have different optical properties with respect to a direction orthogonal to the optical axial direction of the lens have been put on sale. Examples of such eyeglass lenses include a free-form lens and a gradation lens. For example, the free-form lens is designed in consideration of an eyeglass frame and/or an eye point, or designed such that the optical properties are varied along an upper-lower direction. Thus, the lens design may be different between the upper portion and the lower portion of the eyeglass lens. In the gradation lens, the color density may be different between the upper portion and the lower portion, for example. If a pair of eyeglasses is manufactured by processing such a lens with the erroneous state of up-down and right-left directions of the lens, the eyeglasses may not function as such, or may have a design different from the initial design.

In the point marking method described in JP-A-2006-292650, merely a reference for the optical center and the astigmatic axial angle is indicated. While a mark point indicating the astigmatic axial angle defines an axial angle, the mark point does not define a direction. Thus, a lens that has different optical properties with respect to the direction orthogonal to the optical axial direction of the lens, such as the gradation lens, the free-form lens, and a progressive lens, has the risk of being processed with the up-down and right-left directions mistaken.

An object of the present disclosure is to provide an eyeglass lens measuring apparatus that provides an eyeglass lens with a mark point that facilitates the determination of the upper portion and the lower portion of the eyeglass lens, a method for distinguishing the upper portion from the lower portion of an eyeglass lens (method for determining an orientation in an upper-lower direction of the eyeglass lens), and a point marking adapter.

An embodiment of the present disclosure may be described as follows.

(1) An eyeglass lens measuring apparatus (present eyeglass lens measuring apparatus) according to an embodiment of the present disclosure includes: a measuring optical system configured to measure optical properties of an eyeglass lens for the right eye and optical properties of an eyeglass lens for the left eye; and a point marking mechanism including a first point marking member configured to provide a first mark point defining an optical center and an astigmatic axis of the eyeglass lens which are acquired by using the measuring optical system, and a second point marking member configured to provide a second mark point defining an upper portion and a lower portion of the eyeglass lens, wherein the point marking mechanism is configured to provide the eyeglass lens for the right eye and the eyeglass lens for the left eye respectively with the second mark points almost the same in position.

(2) A method for distinguishing an upper portion from a lower portion of an eyeglass lens according to an embodiment of the present disclosure includes: providing the eyeglass lens with the second mark point by using the point marking mechanism of the present eyeglass lens measuring apparatus; and determining the upper portion and the lower portion of the eyeglass lens by using the second mark point on the eyeglass lens.

(3) In the present eyeglass lens measuring apparatus, the second point marking member may include a separate point-marking ink pen disposed at a position different from a point-marking ink pen of the first point marking member.

(4) In the present eyeglass lens measuring apparatus, the second point marking member may be configured to share a point-marking ink pen of the first point marking member with the first point marking member, and the ink pen that provides the second mark point may be an ink pen of a type different from another ink pen of the first point marking member.

In the present eyeglass lens measuring apparatus, the measuring optical system may be able to measure the optical properties of the eyeglass lens for the right eye and the optical properties of the eyeglass lens for the left eye successively.

In the present eyeglass lens measuring apparatus, the point marking mechanism may be configured to provide the eyeglass lens for the right eye and the eyeglass lens for the left eye with the mark point almost the same in position.

In the present eyeglass lens measuring apparatus, the point marking mechanism may be configured to provide the first mark point and the second mark point on the eyeglass lens simultaneously.

(5) A point marking adapter according to an embodiment of the present disclosure may include a point marking member configured to provide a mark point defining an upper portion and a lower portion of an eyeglass lens, and the point marking adapter may be configured to be mounted on an eyeglass lens measuring apparatus.

(6) A method for distinguishing an upper portion from a lower portion of an eyeglass lens according to an embodiment of the present disclosure may include: acquiring an optical center and an astigmatic axis of the eyeglass lens; providing a first mark point defining the optical center and the astigmatic axis of the eyeglass lens; providing a second mark point defining the upper portion and the lower portion of the eyeglass lens; and determining the upper portion and the lower portion of the eyeglass lens by using the second mark point.

The present eyeglass lens measuring apparatus, the method for distinguishing an upper portion from a lower portion of an eyeglass lens, and the point marking adapter can provide the eyeglass lens with a mark point that facilitates the determination of the upper portion and the lower portion of the eyeglass lens.

In the following, an embodiment of the present disclosure will be described with reference to the drawings. FIGS. 1 to 14 are diagrams each illustrating the configuration of an eyeglass lens measuring apparatus according to the present embodiment. In the following description, a lens meter will be described as an example of the eyeglass lens measuring apparatus. However, the eyeglass lens measuring apparatus according to the present embodiment is not limited to the lens meter. The present embodiment may be applied to an apparatus that can measure the optical properties of an eyeglass lens.

<Overview>

The apparatus according to the embodiment of the present disclosure will be briefly described. A lens meter 100 according to the present embodiment is provided with a measuring optical system 10 for measuring the optical properties of an eyeglass lens. The lens meter 100 can successively measure an eyeglass lens for the right eye and an eyeglass lens for the left eye.

The lens meter 100 is also provided with a point marking mechanism 80. The point marking mechanism 80 can simultaneously provide a first mark point and a second mark point on the eyeglass lens. For example, the point marking mechanism 80 includes a first point marking member and a second point marking member. For example, the first point marking member provides a first mark point. The first mark point defines an optical center and an astigmatic axis of the eyeglass lens that are acquired by the measuring optical system 10. For example, the second point marking member provides a second mark point. The second mark point defines an upper portion and a lower portion of the eyeglass lens. That is, the second mark point defines the orientation in an upper-lower direction of the eyeglass lens.

Providing the eyeglass lens simultaneously with the first mark point and the second mark point does not necessarily mean only that the mark points are provided at the same time. Providing the first mark point and the second mark point simultaneously includes, for example, providing the first mark point and the second mark point in a single operation of providing the eyeglass lens with the mark points.

The point marking mechanism 80 forms the mark points almost the same in position on the eyeglass lens for the right eye and the eyeglass lens for the left eye. Based on the second mark point provided on each eyeglass lens, the upper portion and the lower portion of each eyeglass lens can be determined.

For example, the second point marking member may be provided with a separate point-marking ink pen at a different position from a point-marking ink pen attached to the first point marking member.

Further, for example, the second point marking member may share the point-marking ink pen attached to the first point marking member. The ink pen for providing the second mark point may be an ink pen of a different type from another ink pen attached to the first point marking member.

In the present embodiment, by way of example, the eyeglass lens measuring apparatus provided with the point marking mechanism is described. However, the technology of the present disclosure is not limited to such an apparatus, and is applicable to a point marking adapter (point marking apparatus) attached to the eyeglass lens measuring apparatus.

For example, the point marking adapter is mounted on an eyeglass lens measuring apparatus provided with the first point marking member. The first point marking member provides a first mark point defining an optical center and an astigmatic axis of an eyeglass lens that are acquired by using a measuring optical system. The point marking adapter includes a second point marking member configured to provide the second mark point defining an upper portion and a lower portion of the eyeglass lens. The point marking adapter is mounted on the eyeglass lens measuring apparatus. Thus, the eyeglass lens measuring apparatus can provide the first mark point and the second mark point on the eyeglass lens simultaneously. The first mark point and the second mark point are formed almost the same in position on the eyeglass lens for the right eye and the eyeglass lens for the left eye. Based on the second mark point provided on each eyeglass lens, the upper portion and the lower portion of each eyeglass lens can be determined.

EXAMPLE

In the following, an example of the embodiment of the present disclosure will be described with reference to the drawings. In the present example, a lens meter will be described as an example of the eyeglass lens measuring apparatus.

FIG. 1 is an exterior perspective view of the lens meter 100. First, an overall configuration of the lens meter 100 will be described. The lens meter is provided with a measuring optical system, a nose piece (lens mount base) 16, a lens holder 30, a control unit 70, a display 50, and a point marking mechanism 80. The measuring optical system projects measurement light onto an examined lens (eyeglass lens) LE. The measuring optical system receives the measurement light that has passed through the lens LE, and measures the optical properties (displacement) of the measurement light. The nose piece 16 is a base on which the examined lens LE is mounted. The lens holder 30 holds the lens LE placed on the nose piece 16 from above. The control unit 70 controls the apparatus (members of the lens meter 100), and performs various computations. The display 50 is a monitor that displays an alignment mark and/or a measurement result. The display 50 is provided with a touchscreen type input member. After measurement, the point marking mechanism 80 provides the lens LE with mark points.

The lens meter 100 can also measure the optical properties of the eyeglass lens for the right eye and the optical properties of the eyeglass lens for the left eye successively.

Figure 2:
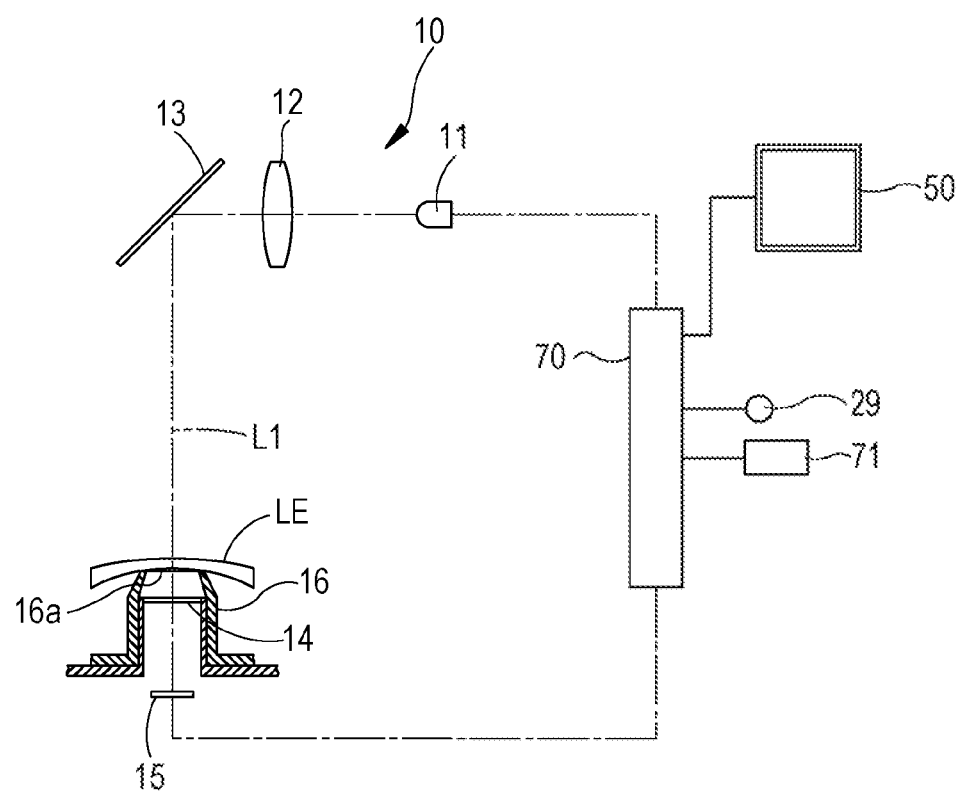
FIG. 2 is a schematic diagram illustrating the configurations of optical and control systems of the lens meter.

FIG. 2 is a schematic configuration diagram illustrating an optical system and a control system of the measuring optical system 10. On a measurement light axis L1, optical members are disposed. The measuring optical system 10 is provided with a measurement light source 11 such as an LED, a collimator lens 12, a mirror 13, a measurement target plate 14, and a two-dimensional light receiving sensor (light receiving device) 15. In the measurement target plate 14, a number of measurement targets with a predetermined pattern are formed. Over the measurement target plate 14, an opening 16a of the nose piece 16 is positioned. The opening 16a has a circular shape with a diameter of 8 mm, for example. In the measurement target plate 14, a number of measurement targets are formed. The measurement targets have a geometric pattern for measuring a dioptric power distribution of the lens in the opening 16a at once. According to the present example, a grid target is adopted as the measurement targets. The grid target includes a number of circular holes disposed in a grid.

The control unit 70 governs and controls the apparatus as a whole (members of the lens meter 100). To the control unit 70, a measurement light source 11, a light receiving sensor 15, a display 50, a switch 29, and a memory 71 are connected. In the memory 71, a control program for the lens meter 100, and scale information displayed on a scale display screen are stored, for example. The control program includes programs for executing processes (modules) for, for example, a computation process for computing a dioptric power at the optical center of the lens LE and a dioptric power distribution around the optical center, a display process for displaying a measurement result, and/or a processing process for processing the measurement result. The control unit 70 executes the processes. In the memory 71, setting information and/or the measurement result are stored. The control unit 70 also provides a display control unit. The display control unit controls display of the measurement result and an alignment guide mark on the display 50.

The light flux from the measurement light source 11 are made parallel light flux by the collimator lens 12, reflected by the mirror 13, and then projected onto the lens LE mounted on the nose piece 16. Of the light flux that have passed through the lens LE, the light flux that have passed through the holes in the measurement target plate 14 enter the light receiving sensor 15. An output signal from the light receiving sensor 15 is input to the control unit 70. The control unit 70 computes dioptric powers (spherical power S, cylindrical power C, astigmatic axial angle A, and/or prism value A) as optical properties of the lens LE. That is, the control unit 70 uses as a reference position the coordinate position of the target image of each hole that is incident on the light receiving sensor 15 when the lens LE is not placed on the optical path. Further, the control unit 70 acquires a positional change (change from the reference position) of each target image (dot pattern) when the lens LE having a refractive power is placed on the optical path. The control unit 70 computes the optical properties of the lens LE based on the acquired positional change. For this measurement technique, a well-known technique described in JP-A-2008-241694 may be applied.

Figure 3:
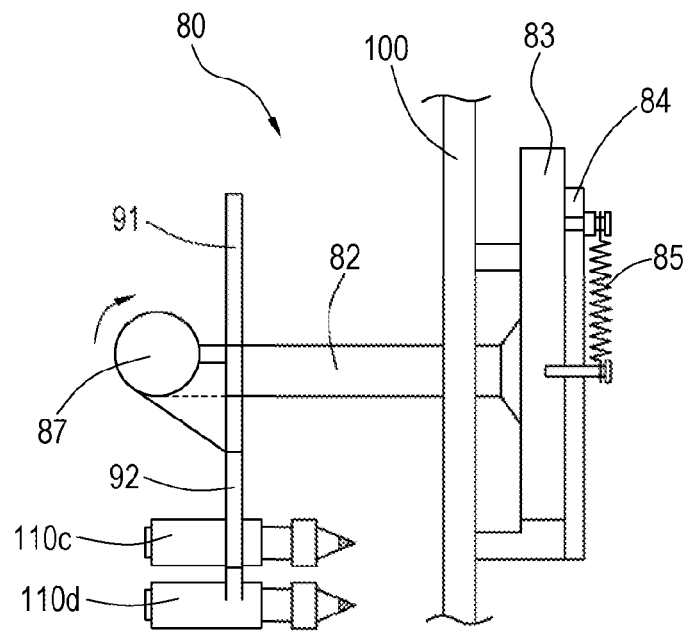
FIG. 3 is a partially cross-sectional side view of a point marking mechanism.
Figure 4:
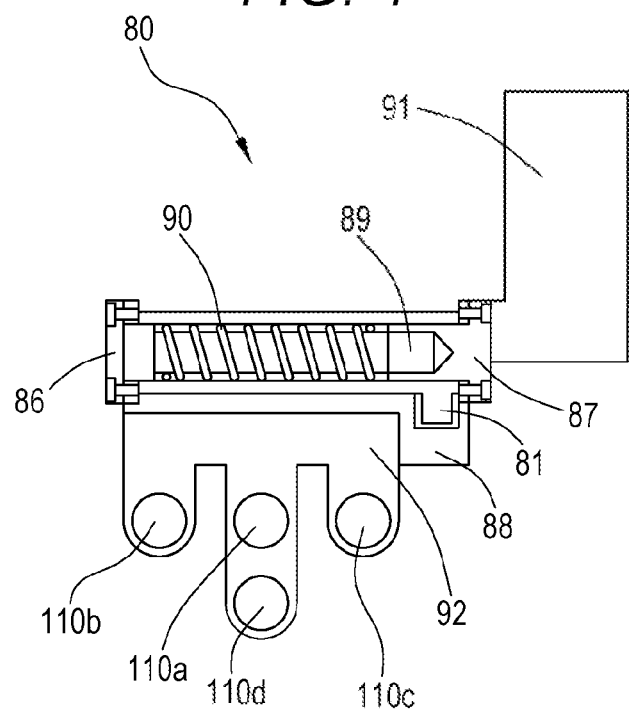
FIG. 4 is a front view of a major portion of the point marking mechanism.

Next, the point marking mechanism 80 of the lens meter will be described. FIG. 3 is a partially cross-sectional side view of the point marking mechanism 80 according to the present example. FIG. 4 is a front view of a major portion of the point marking mechanism 80. A cylindrical point marking support base 81 has one end provided with an arm 82. The point marking support base 81 and the arm 82 are integrated with a slide portion 83 in the main body. The slide portion 83 is moved up or down along a rail 84 fixed to the main body. As the slide portion 83 moves up or down, the point marking support base 81 also moves up or down. A spring 85 extends between the slide portion 83 and the rail 84. When the point marking support base 81 moves downward, the spring 85 exerts a force to return the point marking support base 81 upward.

As illustrated in FIG. 4, lids 86 and 87 are attached to the opposite ends of the point marking support base 81 so as to be rotatable with respect to the point marking support base 81. Both ends of a junction member 88 are respectively fixed onto the lids 86 and 87. The junction member 88 rotates together with the lids 86 and 87. The junction member 88 also prevents the lids 86 and 87 from being detached. The lid 87 is in threaded engagement with a shaft 89. The shaft 89, the lids 86 and 87, and the junction member 88 are integrally rotatable about the axis of the point marking support base 81. The shaft 89, the lids 86 and 87, and the junction member 88 are biased in one rotational direction by a spring 90, and are normally in the state illustrated in FIG. 3. To the junction member 88, an arm 92 is fixed. To the arm 92, point marking members 110a, 110b, and 110c as first point marking members, and a point marking member 110d as a second point marking member are attached. The point marking members 110a to 110d are configured to provide mark points on an upper surface of the lens LE. That is, the point marking members 110a to 110d include ink pens or ink pen tips at the tip of the point marking members. The point marking members 110a to 110d further include ink bottles inside. The point marking members 110b and 110c are linearly disposed to the left and right of the point marking member 110a. The point marking member 110d is disposed under the point marking member 110a (in the standby state in FIG. 3).

<Display Screen>

Figure 5A:
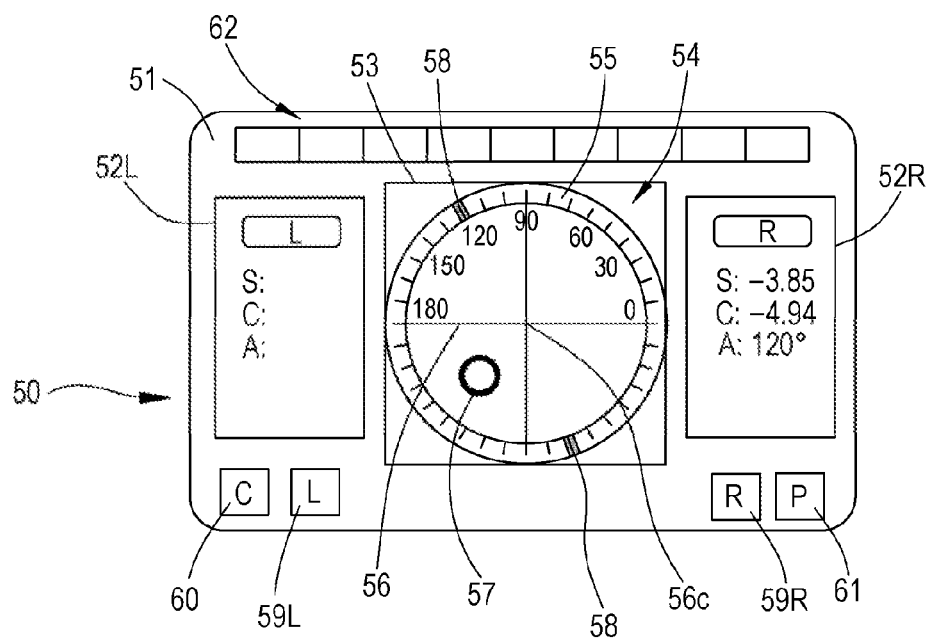
FIGS. 5A and 5B are diagrams each illustrating exemplary display screens during lens measurement.
Figure 5B:
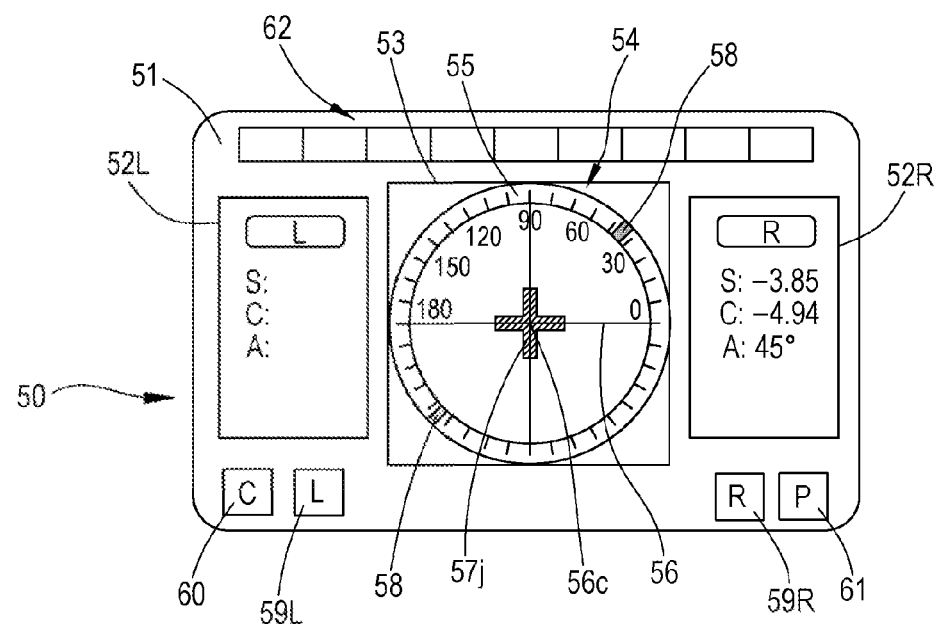
Figure 6:
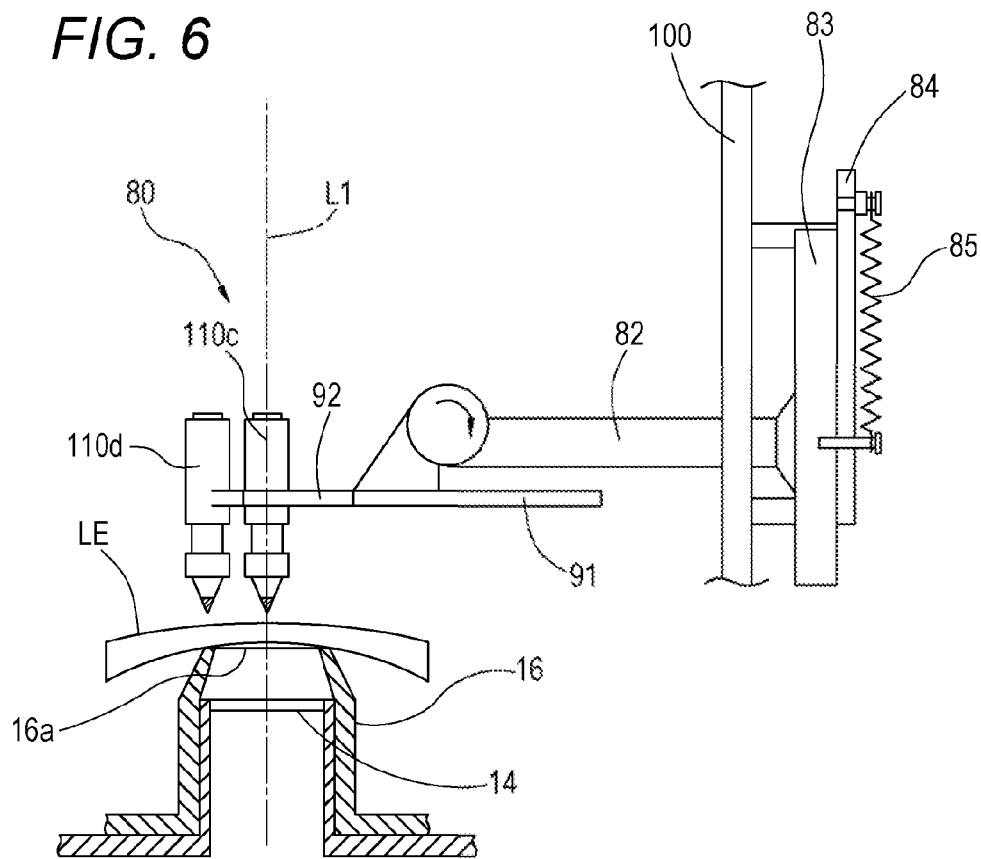
FIG. 6 is a diagram of the point marking mechanism providing an eyeglass lens with mark points.

Display screens displayed on the display 50 will be described. FIGS. 5A and 5B illustrate exemplary display screens displayed on the display 50 during the measurement of the lens LE, respectively. The display 50 displays various buttons. When a measurer touches a button, a signal is sent from the display 50 to the control unit 70. An upper part of the measurement screen 51 displays a group of buttons 62 for making various measurement settings.

At the center of the measurement screen 51, display sections 52L and 52R, and an alignment display section 53 are displayed. The display sections 52L and 52R display, for example, measurement values (S, C, and A) of the left and right eyeglass lenses LE, respectively. The alignment display section 53 displays the position of the nose piece 16, and the position of the optical center of the eyeglass lens LE.

The alignment display section 53 will be described. In the alignment display section 53, an alignment circle 54 is displayed. On the circumference of the alignment circle 54, a protractor graduation 55 is displayed. In the alignment display section 53, a reticle 56 including a vertical line and a horizontal line is displayed as an alignment guide mark. The center position of the nose piece 16 is indicated by the center 56c of the reticle 56 at which the vertical line and the horizontal line intersect each other.

In the alignment display section 53, a ring mark 57 is also displayed. The ring mark 57 indicates an alignment deviation of the optical center of the lens LE with respect to the measurement light axis L1. The ring mark 57 indicates the optical center of the eyeglass lens LE. The center (center 56c) of the vertical line and the horizontal line of the reticle 56 corresponds to an alignment target. By moving the lens LE so as to align the ring mark 57 with the center 56c of the reticle 56, alignment for disposing the lens LE on the measurement light axis L1 can be performed. Based on the prism amount and/or the dioptric power of the lens LE, the control unit 70 determines the amount and direction of displacement of the optical center of the lens LE with respect to the measurement light axis L1. Further, the control unit 70 varies the display position of the ring mark 57 with respect to the reticle 56 based on the amount of deviation and the displacement direction.

When the lens LE with a cylindrical power is measured, an AXIS bar 58 is displayed in the portion of the protractor graduation 55, and further an astigmatic axial angle of the lens LE is indicated.

In a lower part of the measurement screen 51, there are displayed a left lens designation button 59L and a right lens designation button 59R for designating the left and right of the eyeglass lens LE, a clear button 60 for erasing stored measurement data, and a print button 61 for printing out the measurement data, for example.

<Point Marking Operation and Control>

A method for providing mark points to a pair of left and right eyeglass lenses by the lens meter 100 with the above-described configuration prior to lens processing will be described. An operation and control of the lens meter 100 will also be described. The eyeglass lens LE used for the description has different optical properties between the upper portion and the lower portion.

First, the examiner (measurer) touches the right lens designation button 59R in the measurement screen 51 illustrated in FIG. 5A. When the right lens designation button 59R is touched, a selection signal is sent from the display 50 to the control unit 70. Thus, measurement of the right lens LE can be started.

The examiner confirms marks Mu and Md for determining the upper portion and the lower portion (see FIG. 1) that are printed on the right lens LE to be provided with a mark point. Thus, the examiner determines the upper portion and the lower portion of the lens LE. The mark Mu is printed on the upper portion of the lens LE. The mark Md is printed on the lower portion of the lens LE. The marks Mu and Md vary depending on the manufacturer of the lens LE. The marks Mu and Md may have various patterns. The examiner places the lens LE on the nose piece 16 so that the upper portion of the right lens LE (mark Mu side), which is determined by the marks Mu and Md, can face forward, and simultaneously the convex surface of the lens LE can face upward while holding the lower portion (mark Md side) face the main body of the lens meter 100. When the lens LE is placed on the nose piece 16, the target images of the measurement target plate 14 are optically received by the light receiving sensor 15. Based on the target images, the control unit 70 computes the dioptric powers (S, C, and A) of the lens LE. The computed dioptric powers are displayed in the display section 52R for displaying the measurement values of the right lens LE.

The examiner moves the lens LE so as to move the ring mark 57 toward the center of the reticle 56. Thus, the examiner aligns the optical center of the lens LE on the measurement light axis L1. When the optical center of the lens LE is located within an allowable range for alignment completion (0.8 mm from the measurement light axis L1) by the movement of the lens LE, the ring mark 57 is turned into a large cross mark 57j, as illustrated in FIG. 5B. In the case of the lens LE with a cylindrical power, the examiner rotates the lens LE while looking at the AXIS bar 58, the protractor graduation 55, and the AXIS display on the display section 52R to adjust the astigmatic axial angle to a desired angle. For example, when the desired astigmatic axial angle is 45°, the examiner rotates the lens LE until the AXIS display is 45°. During the rotation of the lens LE, the examiner also confirms the marks Mu and Md to maintain the state in which the upper portion of the lens LE (mark Mu side) is on the examiner side, while the lower portion (mark Md side) of the lens LE is on the lens meter side. When the switch 29 is pressed by the examiner, the dioptric powers (S, C, and A) are displayed on hold in the display section 52R displaying the measurement values of the right lens LE.

In this state, the examiner presses a lever 91 of the point marking mechanism 80 (see FIG. 6) 90° forward. Then, the point marking members 110a, 110b, 110c, and 110d, being integral with the lever 91, are rotated by 90°. It allows the pen tips to face downward. At this time, the pen tip of the point marking member 110a is disposed on the measurement light axis L1 illustrated in FIG. 6. The pen tips of the point marking members 110a, 110b, and 110c are disposed in a reference axial direction (horizontal direction of the lens LE) that defines the astigmatic axis. The point marking member 110d is disposed closer to the examiner than the point marking member 110a is. When the examiner presses the lever 91 further downward, the lens LE is provided with mark points 120a, 120b, 120c, and 120d by the point marking members 110a, 110b, 110c, and 110d.

When the measurement of dioptric power of the right lens LE and the provision of the mark points are completed, the examiner detaches the right lens LE from the nose piece 16. Then, the examiner touches the left lens designation button 59L displayed on the measurement screen 51. When the left lens designation button 59L is touched, a selection signal is sent from the display 50 to the control unit 70. Thus, the measurement of the left lens LE can be started. Thereafter, the measurement of dioptric power and the provision of mark points for the left lens LE are performed as in the case of the right lens LE.

For example, the examiner, as in the case of the right lens LE, aligns the left lens LE and provides the left lens LE with mark points with the point marking mechanism 80. Mark points 120a to 120d are provided almost the same in position on the left lens LE as the mark points on the right lens LE.

The point marking mechanism 80 can provide substantially the same mark points (mark points 120a to 120d) on the lens LE regardless of the manufacturer.

<Description of Mark Points>

Figure 7:
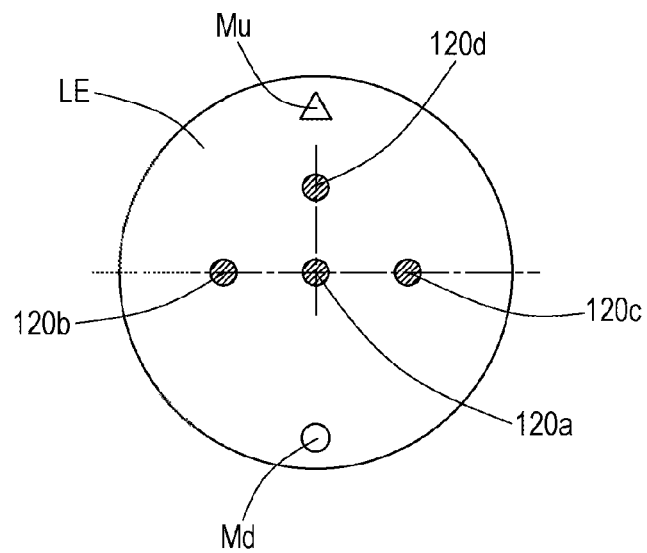
FIG. 7 is a diagram of the eyeglass lens provided with mark points by the point marking mechanism.

The mark points provided by the point marking mechanism 80 according to the present example will be described with reference to the drawings. FIG. 7 illustrates the eyeglass lens LE provided with the mark points by the point marking mechanism 80 according to the present example. Four mark points are provided on the surface of the eyeglass lens LE by the point marking mechanism 80. The four mark points include mark points 120a, 120b, and 120c as the first mark points, and a mark point 120d as the second mark point. Of these, the mark points 120a, 120b, and 120c are disposed on a straight line. The mark point 120a indicates the optical center of the eyeglass lens LE. The mark points 120b and 120c are disposed to the left and right, respectively, of the mark point 120a. The straight line connecting the mark points 120b and 120c indicates a reference axial direction (horizontal direction) defining the astigmatic axis. The reference axial direction refers to the direction in which the astigmatic axis is 0° (180°). The mark point 120d is used for determining the upper portion and the lower portion of the eyeglass lens LE. That is, the mark point 120d has the role of indicating the upper-lower direction of the eyeglass lens LE.

The mark point 120d is provided above the mark point 120a on the lens LE. The examiner sees that the center of the mark points arranged at three points on the straight line is the mark point 120a, that the mark points to the left and right of the mark point 120a are the mark points 120b and 120c, and that the mark point not on the straight line connecting the three mark points is the mark point 120d.

The examiner can determine the upper portion and the lower portion of the eyeglass lens LE having different optical properties between the upper portion and the lower portion, based on the position of the mark point 120d. The examiner, in order to determine the upper portion and the lower portion of the lens LE, sets the orientation of the lens LE such that the mark points 120a to 120c are arranged in the horizontal direction, and then looks at the convex surface side of the lens LE. At this time, if the mark point 120d is on the upper portion, it can be confirmed that the orientation of the lens LE in the upper-lower direction is correct. Conversely, if the mark point 120d is on the lower portion, it can be confirmed that the orientation of the lens LE in the upper-lower direction is opposite.

Of course, the examiner can determine the upper portion and the lower portion of the lens LE (i.e., determine the orientation of the lens LE in the upper-lower direction) based on the marks Mu and Md printed on the lens LE by the manufacturer. However, the marks Mu and Md vary depending on the manufacturer. Thus, the examiner would have to determine the upper portion and the lower portion of the lens LE relying on the various types of marks that differ depending on the manufacturer of the lens LE. In this case, an inexperienced examiner may erroneously determine the upper portion and the lower portion of the lens LE. According to the present disclosure, the examiner can be almost completely prevented from mistaking the upper portion and the lower portion of the lens LE of any manufacturer, as long as the examiner is aware of the positions of the mark points provided by the point marking mechanism 80 according to the present example. Thus, the upper portion and the lower portion of the lens LE can be easily determined.

Further, the point marking mechanism 80 according to the present example can provide the lens LE of various manufacturers and/or types with the mark points 120a to 120d almost the same in position. Thus, the lens LE provided with the mark points by the point marking mechanism 80 is effective in causing an apparatus for determining the upper portion and the lower portion of the lens LE (such as a blocking apparatus or a lens processing apparatus) to determine the upper portion and the lower portion of the lens LE automatically and easily. The marks provided on the lens LE are different from one manufacturer to another, as described above. Thus, when the upper portion and the lower portion are determined automatically by identifying the marks Mu and Md printed by the manufacturer by using an apparatus, settings are made to identify the marks in accordance with the manufacturer of the lens LE in order to detect the marks Mu and Md. According to the present example, the mark points for determining the upper portion and the lower portion are provided in the same way irrespective of the lens LE. Thus, the mark points 120a to 120d can be detected from any lens LE by image analysis and the like based on the same setting. Accordingly, the upper portion and the lower portion of the lens LE can be automatically and easily determined.

Further, the mark points provided by the point marking mechanism 80 according to the present example are disposed almost the same in position on the left and right lenses LE. Thus, even when the mark points are disposed almost the same in position to the left and right of the lens LE, the upper portion and the lower portion of the lens LE can be determined. Accordingly, the need for a configuration for providing the mark points at different positions between the left and right lenses LE is eliminated. Thus, the point marking mechanism 80 of a simple configuration can provide the lens LE with the mark points that enable easy determination of the upper portion and the lower portion of the lens LE.

The locations of the mark points with which the eyeglass lens LE is provided are not limited to the locations according to the present example. The mark points may be provided at positions such that the upper portion and the lower portion can be determined by the mark points. Thus, the mark points may be provided at irregular positions as long as the upper portion and the lower portion of the lens LE can be determined. It may also be possible to determine the upper portion and the lower portion of the lens LE by providing the lens LE with a single mark point at a position other than the geometric center of the lens LE.

According to the present example, the point marking member 110d is disposed below the point marking member 110a (in the stand-by state in FIG. 3). However, the position of the point marking member 110d is not limited to such a position. The point marking member 110d may be disposed above the point marking member 110a (in the stand-by state in FIG. 3).

In the above description, the mark points are provided manually by the examiner using the point marking mechanism 80. However, the method for providing the mark points is not limited to the manual method. For example, a configuration may be adopted in which the optical center of the lens LE is detected and the mark points are provided automatically. In this case, the examiner determines the upper portion and the lower portion of the lens LE based on the marks Mu and Md, and then places the lens LE on the eyeglass lens measuring apparatus. When the lens is disposed, the control unit detects the optical center of the lens LE, and then provides the mark points automatically.

<First Modification>

Figure 8A:
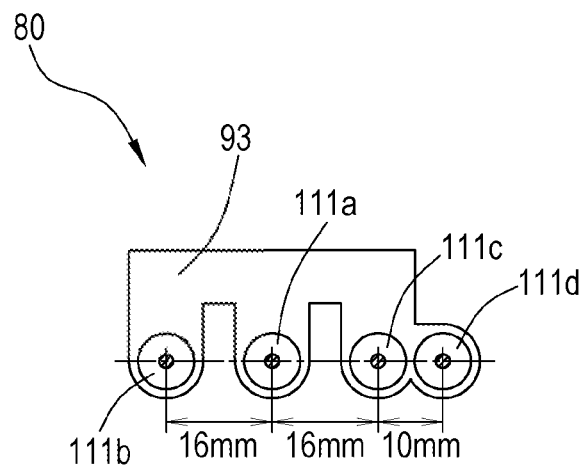
FIGS. 8A and B are diagrams each illustrating a first modification.
Figure 8B:
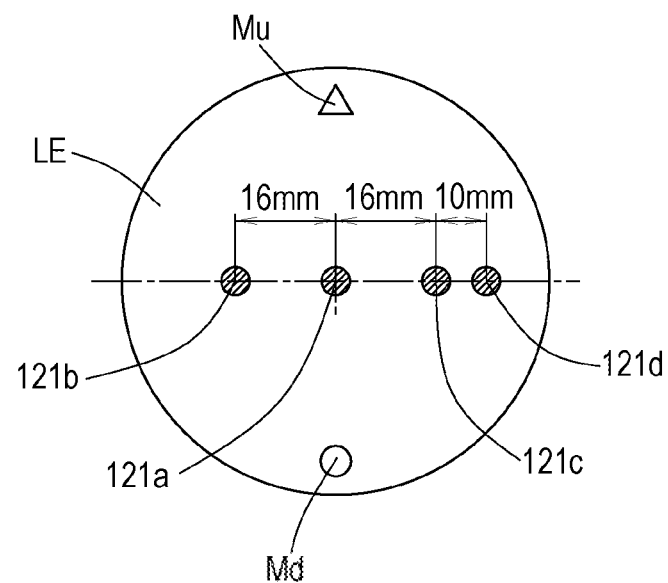

A modification of the present example will be described with reference to the drawings. In the following description of the modification, configurations designated with numerals similar to those of the configurations of the above example have similar functions unless otherwise noted. FIG. 8A is a schematic configuration diagram illustrating part of the point marking mechanism 80 according to a first modification as viewed from the front. FIG. 8B is a schematic view of the convex surface side of the lens LE provided with the mark points by the point marking mechanism 80 according to the first modification.

As illustrated in FIG. 8A, on an arm 93 according to the first modification, point marking members 111a, 111b, 111c, and 111d are attached on a straight line. The point marking members 111b and 111c are disposed to the left and right, respectively, of the point marking member 111a. The point marking member 111d is disposed outside the point marking member 111c. For example, the point marking members 111a, 111b, and 111c are disposed with an interval (first interval) of 16 mm between the ink pen tips. For example, the point marking member 111c and the point marking member 111d are disposed with an interval (second interval) of 10 mm between the ink pen tips.

By the point marking mechanism 80 according to the present modification, four mark points, i.e., mark points 121a, 121b, 121c, and 121d are provided on the surface of the eyeglass lens LE, as illustrated in FIG. 8B. The four mark points are disposed linearly. The mark point 121a indicates the optical center of the eyeglass lens LE. The mark points 121b and 121c are disposed to the left and right of the mark point 121a. A straight line connecting the mark points 121b and 121c indicates the reference axial direction (horizontal direction) defining the astigmatic axis. The mark point 121d is used for determining the upper portion and the lower portion of the eyeglass lens LE. That is, the mark point 121d has the role of indicating the upper-lower direction of the eyeglass lens LE.

The mark points 121a, 121b, and 121c are disposed at substantially regular intervals. The intervals (11th interval) are set at 16 mm, for example. The mark point 121d is disposed outside the mark point 121c at an interval of 10 mm (second interval), for example. The examiner can distinguish the outer mark point 121b and the mark point 121d based on the difference in the point marking intervals. That is, the examiner can determine that of the outer mark points, the one with a narrower interval with the adjacent mark point is the mark point 121d, and that the one with a greater interval is the mark point 121b. The examiner can also determine that the mark point 121b is adjacent to the mark point 121a and the mark point 121d is adjacent to the mark point 121c.

In the above example, the point marking members 111a, 111b, and 111c are disposed with the interval (first interval) of 16 mm between the respective ink pen tips. Further, the point marking member 111c and the point marking member 111d are disposed with the interval (second interval) of 10 mm between the ink pen tips. However, this does not limit the manner in which the point marking members 111a, 111b, 111c, and 111d are disposed. The point marking members may be disposed in any way as long as the first interval and the second interval are different from each other. In this way, the upper portion and the lower portion of the lens LE can be determined by the difference in the interval between the mark points provided on the lens LE. The first interval and the second interval may be arbitrarily designed. For example, the point marking members 111a, 111b, and 111c may be disposed with an interval of 20 mm between the respective ink pen tips. In this case, the point marking member 111c and the point marking member 111d may be disposed with an interval of 16 mm between the ink pen tips.

According to the present modification, the interval between the four mark points is set so as to enable the determination of the orientation of the lens LE in the upper-lower direction (i.e., to determine the upper portion and the lower portion of the lens LE). However, the number of the mark points is not limited to four and may be an arbitrary number. For example, the orientation of the lens LE in the upper-lower direction may be determined by appropriately setting the interval between the mark points at three points. A similar result may be obtained by appropriately setting the interval between mark points at five points.

Based on the position of the mark point 121d, the examiner can determine the upper portion and the lower portion of the eyeglass lens LE having different optical properties between the upper portion and the lower portion. The mark points 121a to 121c may be arranged in the horizontal direction of the eyeglass lens LE. In this case, the examiner, in order to determine the upper portion and the lower portion of the lens LE, sets the orientation of the lens LE such that the mark points 121a to 121d are arranged in the horizontal direction, and looks at the convex surface side of the lens LE. At this time, if the mark point 121d is on the right side, the examiner can confirm that the orientation of the eyeglass lens LE in the upper-lower direction is correct. Conversely, if the mark point 121d is on the left side, the examiner can confirm that the orientation of the eyeglass lens LE in the upper-lower direction is opposite.

When the mark points are provided, if the lens LE is rotated such that the upper part of the lens LE is located on the lens meter side while the lower part of the lens LE is located on the examiner side, the orientation in the upper-lower direction is correct when the mark point 121d is on the left side. Conversely, the orientation in the upper-lower direction is opposite when the mark point 121d is on the right side.

By using a similar determination method, the upper portion and the lower portion of the lens LE can be determined by using another apparatus. In this case, the determination of the upper portion and the lower portion of the lens LE can be automatically performed by detecting the mark points 121a to 121d through image analysis and the like.

<Second Modification>

Figure 9A:
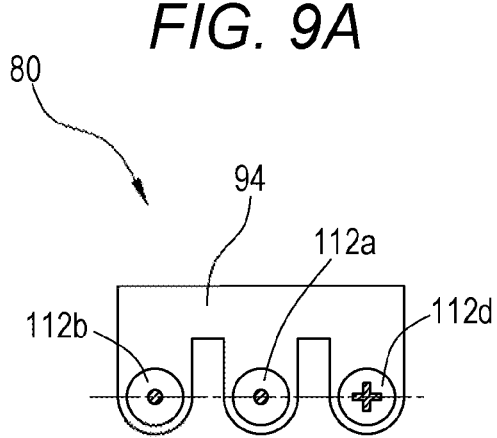
FIGS. 9A and B are diagrams each illustrating a second modification.
Figure 9B:
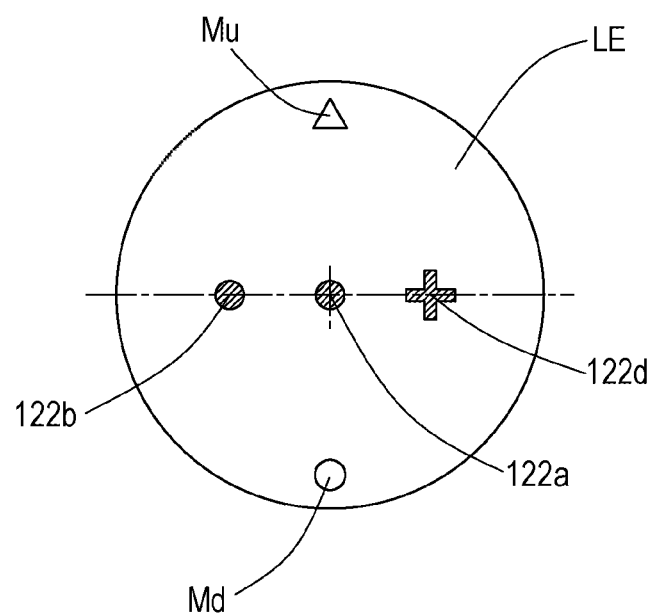

A second modification of the present example will be described with reference to the drawings. FIG. 9A is a schematic configuration diagram illustrating part of the point marking mechanism 80 according to the second modification as viewed from the front. FIG. 9B is a schematic view of the convex surface side of the lens LE provided with the mark points by the point marking mechanism 80 according to the second modification.

As illustrated in FIG. 9A, to three fingers of an arm 94 according to the second modification, point marking members 112a, 112b, and 112c, respectively, are attached on a straight line. The point marking members 112b and 112c are disposed to the left and right of the point marking member 112a. The pen tips of the point marking members 112a and 112b are conically shaped. When the point marking members 112a and 112b are used, the lens LE is provided with dot-like mark points 122a and 122b. The pen tip of the point marking member 112c has a different shape from the point marking members 112a and 112b and is cross-shaped. The point marking member 112c provides the lens LE with a cross-shaped mark point 122c.

The point marking mechanism 80 according to the present modification provides the surface of the eyeglass lens LE with the mark points at three points, i.e., the mark points 122a, 122b, and 122c, as illustrated in FIG. 9B. The mark points at the three points are disposed linearly. The mark point 122a indicates the optical center of the eyeglass lens LE. The mark points 122b and 122c are disposed to the left and right of the mark point 122a. The straight line connecting the mark points 122b and 122c indicates the direction (horizontal direction) of the reference axis designating the astigmatic axis.

Based on the shape of the mark points, the examiner can distinguish the mark point 122b and the mark point 122c. That is, the examiner can determine that of the outer mark points, the dot-like mark point is the mark point 122b and that the cross-shaped mark point is the mark point 122c.

Based on the position of the mark point 122c, the examiner can determine the upper portion and the lower portion of the eyeglass lens LE with different optical properties between the upper portion and the lower portion. The mark points 122a to 122c may be disposed in parallel with the horizontal direction of the eyeglass lens LE. In this case, the examiner, in order to determine the upper portion and the lower portion of the lens LE, sets the orientation of the lens LE such that the mark points 122a to 122c are arranged in the horizontal direction, and then looks at the convex surface side of the lens LE. At this time, when the mark point 122c is on the right side, for example, the examiner can confirm that the orientation of the eyeglass lens LE in the upper-lower direction is correct. Conversely, when the mark point 122c is on the left side, the examiner can confirm that the orientation of the eyeglass lens LE in the upper-lower direction is opposite.

By using a similar determination method, the upper portion and the lower portion of the lens LE can be determined with another apparatus. In this case, the determination of the upper portion and the lower portion of the lens LE can be performed automatically by detecting the mark points 122a to 122c through image analysis and the like.

<Third Modification>

Figure 10A:
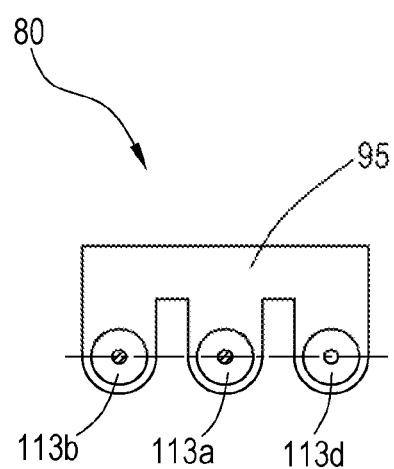
FIGS. 10A and B are diagrams each illustrating a third modification.
Figure 10B:
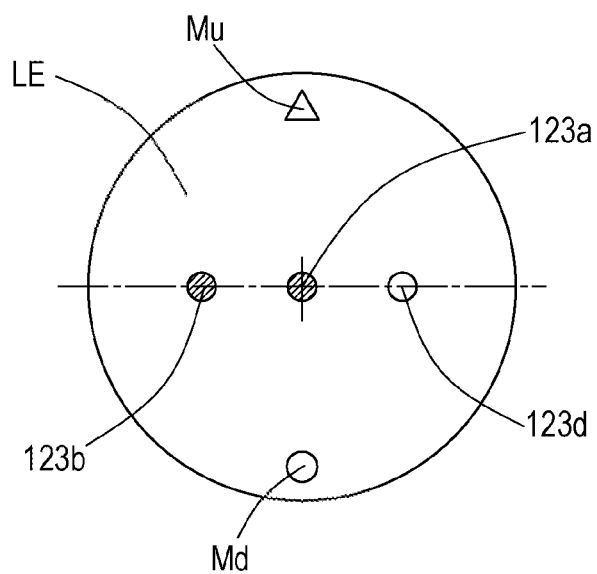

A third modification of the present example will be described with reference to the drawings. FIG. 10A is a schematic configuration diagram illustrating a part of the point marking mechanism 80 according to the third modification as viewed from the front. FIG. 10B is a schematic view of the convex surface side of the lens LE provided with the mark points by the point marking mechanism 80 according to the third modification.

As illustrated in FIG. 10A, to three fingers of an arm 95 according to the third modification, point marking members 113a, 113b, and 113c are attached on a straight line. The point marking members 113b and 113c are disposed to the left and right of the point marking member 113a. The color of the ink in the ink bottles of the point marking members 113a and 113b and the color of the ink in the ink bottle of the point marking member 113c are different. For example, the ink bottles of the point marking members 113a and 113b contain red ink. The ink bottle of the point marking member 113c contains blue ink. Thus, the point marking members 113a and 113b provide red mark points 123a and 123b. On the other hand, the point marking member 113c provides a blue mark point 123c.

By the point marking mechanism 80 according to the present modification, the surface of the eyeglass lens LE is provided with the mark points at three points; namely, the mark points 123a, 123b, and 123c, as illustrated in FIG. 10B. The mark points at the three points are disposed linearly. The mark point 123a indicates the optical center of the eyeglass lens LE. The mark points 123b and 123c are disposed to the left and right of the mark point 123. The straight line connecting the mark points 123b and 123c indicates the direction (horizontal direction) of the reference axis defining the astigmatic axis.

The examiner can distinguish the mark point 123b and the mark point 123c based on the color of the mark points. That is, the examiner can determine that of the outer mark points, the red mark point is the mark point 123b and that the blue mark point is the mark point 123c.

Based on the position of the mark point 123c, the examiner can determine the upper portion and the lower portion of the eyeglass lens LE with different optical properties between the upper portion and the lower portion. The mark points 123a to 123c may be disposed in parallel with the horizontal direction of the eyeglass lens LE. In this case, the examiner, in order to determine the upper portion and the lower portion of the lens LE, sets the orientation of the lens LE such that the mark points 123a to 123c are in parallel with the horizontal direction, and then looks at the convex surface side of the lens LE. At this time, when the mark point 123c is on the right side, for example, the examiner can confirm that the orientation of the eyeglass lens LE in the upper-lower direction is correct. Conversely, when the mark point 123c is on the left side, the examiner can confirm that the orientation of the eyeglass lens LE in the upper-lower direction is opposite.

By using a similar determination method, the upper portion and the lower portion of the lens LE can be determined with another apparatus. In this case, the determination of the upper portion and the lower portion of the lens LE can be automatically performed by detecting the mark points 123a to 123c through image analysis and the like.

<Fourth Modification>

Figure 11A:
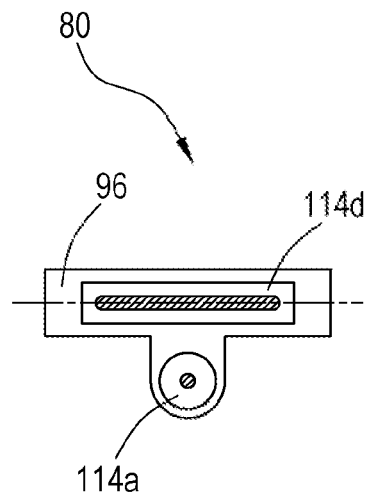
FIGS. 11A and B are diagrams each illustrating a fourth modification.
Figure 11B:
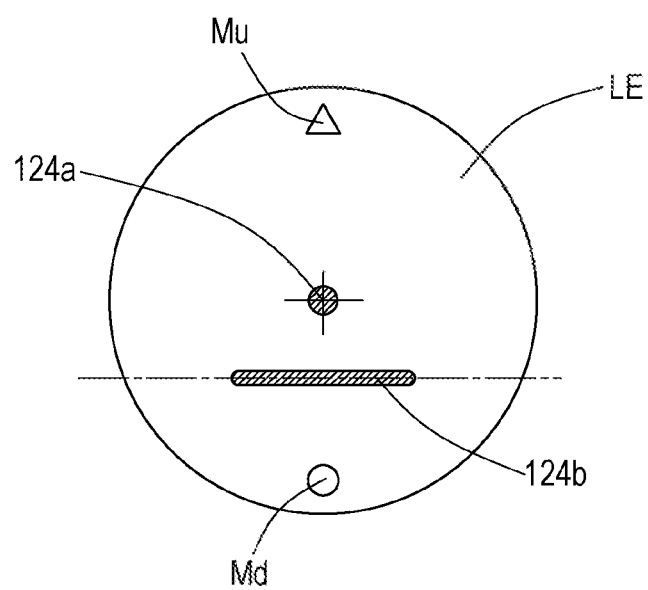

A fourth modification according to the present example will be described with reference to the drawings. FIG. 11A is a schematic configuration diagram illustrating part of the point marking mechanism 80 according to the fourth modification as viewed from the front. FIG. 11B is a schematic view of the convex surface side of the lens LE provided with the mark points by the point marking mechanism 80 according to the fourth modification.

As illustrated in FIG. 11A, an arm 96 according to the fourth modification is provided with a point marking member 114a. The point marking member 114a is provided with a point marking member 114d at the top (or bottom). The pen tips of the point marking members 114a and 114b are conically shaped. When the point marking members 114a and 114b are used, the lens LE is provided with a dot-like mark point 124a. The pen tip of the point marking member 114d has a laterally extended shape. When the point marking member 114c is used, the lens LE is provided with a line-shaped mark point (line) 124c.

By the point marking mechanism 80 according to the present modification, the surface of the eyeglass lens LE is provided with the mark points at the two points; namely, the mark points 124a and 124d, as illustrated in FIG. 11B. The mark point 124a indicates the optical center of the eyeglass lens LE. The mark point 124d is provided below (or above)

the mark point 124a. The direction (straight line direction) in which the line-shaped mark point 124d extends indicates the reference axial direction (horizontal direction) of the astigmatic axis.

Based on the position of the mark point 124d, the examiner can determine the upper portion and the lower portion of the eyeglass lens LE with different optical properties between the upper portion and the lower portion. The straight line direction of the line-shaped mark point 124d may be substantially aligned with the horizontal direction of the eyeglass lens LE. In this case, the examiner, in order to determine the upper portion and the lower portion of the lens LE, sets the orientation of the lens LE such that the straight line direction of the mark point 124d is in the horizontal direction, and then looks at the convex surface side of the lens LE. At this time, when the mark point 124d is above (or below) the mark point 124a, for example, it can be confirmed that the orientation of the eyeglass lens LE in the upper-lower direction is correct. Conversely, when the mark point 124c is above (or below), it can be confirmed that the orientation of the eyeglass lens LE in the upper-lower direction is opposite.

By using a similar determination method, the upper portion and the lower portion of the lens LE can be determined with another apparatus. In this case, the determination of the upper portion and the lower portion of the lens LE can be automatically performed by detecting the mark points 124a and 124d through image analysis and the like.

<Fifth Modification>

Figure 12A:
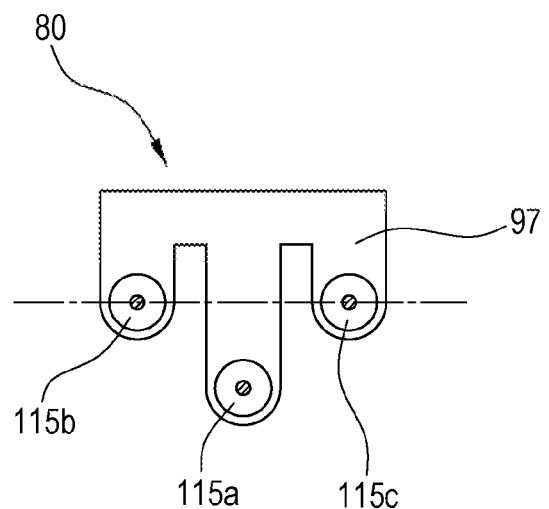
FIGS. 12A and B are diagrams each illustrating a fifth modification.
Figure 12B:
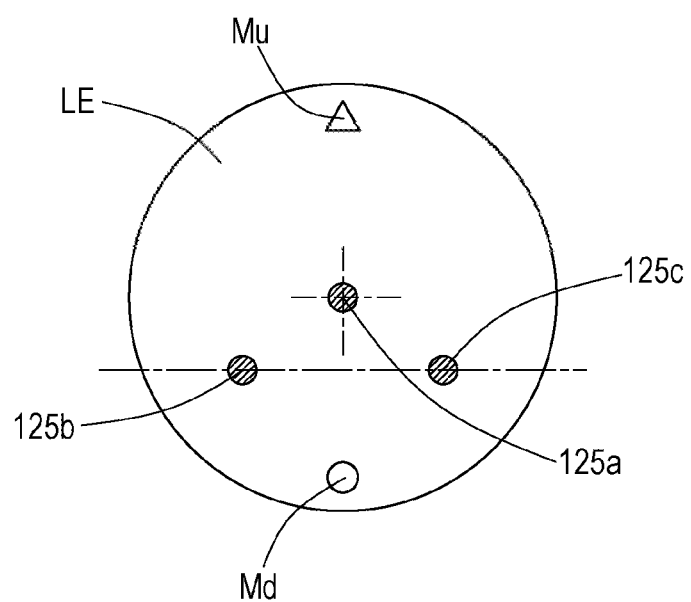

A fifth modification according to the present example will be described with reference to the drawings. FIG. 12A is a schematic configuration diagram illustrating part of the point marking mechanism 80 according to the fifth modification as viewed from the front. FIG. 12B is a schematic view of the convex surface side of the lens LE provided with the mark points by the point marking mechanism 80 according to the fifth modification.

As illustrated in FIG. 12A, an arm 97 according to the fifth modification is provided with a point marking member 115a. Above (or below) the point marking member 115a, point marking members 115b and 115c are arranged in a straight line.

By the point marking mechanism 80 according to the present modification, the surface of the eyeglass lens LE is provided with the mark points at the three points; namely, the mark points 125a, 125b, and 125c, as illustrated in FIG. 12B. The mark point 125a indicates the optical center of the eyeglass lens LE. The mark points 125b and 125c are provided below (or above) the mark point 125a. The direction in which the straight line connecting the mark point 125b and the mark point 125c extend (the straight line direction of the mark points 125b and 125c) indicates the reference axial direction (horizontal direction) of the astigmatic axis.

The examiner can determine the upper portion and the lower portion of the eyeglass lens LE with different optical properties between the upper portion and the lower portion based on the positional relationship between the mark point 125a and the mark points 125b and 125c. The straight line direction of the mark points 125b and 125c may be substantially aligned with the horizontal direction of the eyeglass lens LE.

In the above examples, the orientation of the upper-lower direction of the point marking members of the point marking mechanism (point marking apparatus) 80 may be inverted. That is, the orientation in the upper-lower direction may be inverted as long as the mark points that enable the determination of the upper portion and the lower portion can be provided.

In the above description, the mark points are utilized for determining the upper portion and the lower portion of the lens LE with different optical properties between the upper portion and the lower portion. However, this is not a limitation, and the lens meter 100 according to the present example may be applied for preventing or decreasing the likelihood of the processing of the lens LE with different optical properties between the left side and the right side in a state in which the up-down and right-left directions of the lens LE are mistaken.

In other words, the examiner can also determine the left and right directions of the lens LE based on the mark points enabling the determination of the upper portion and the lower portion of the lens LE. This is because the left and right of the lens LE is naturally determined when the upper portion and the lower portion of the lens LE are determined. Thus, the mark points provided by the point marking mechanism 80 according to the present example may be mark points that enable the determination of the up-down and right-left directions of the lens LE whose optical properties vary depending on directions.

Figure 13A:
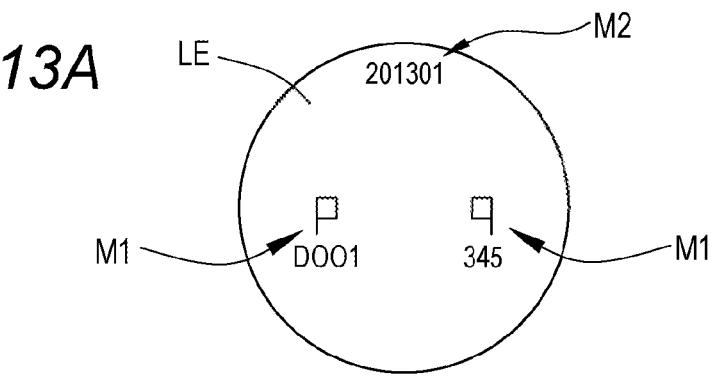
FIGS. 13A and B are diagrams each illustrating an exemplary mark with which an eyeglass lens is provided by a manufacturer of the eyeglass lens.
Figure 13B:
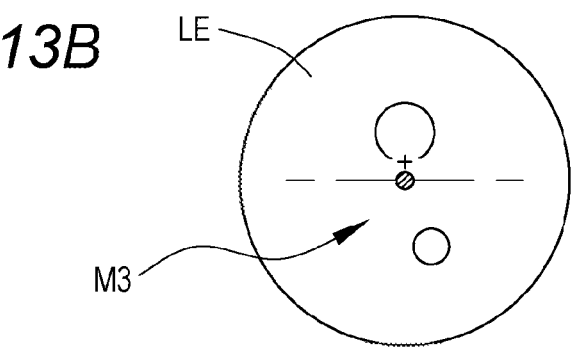
Figure 14:
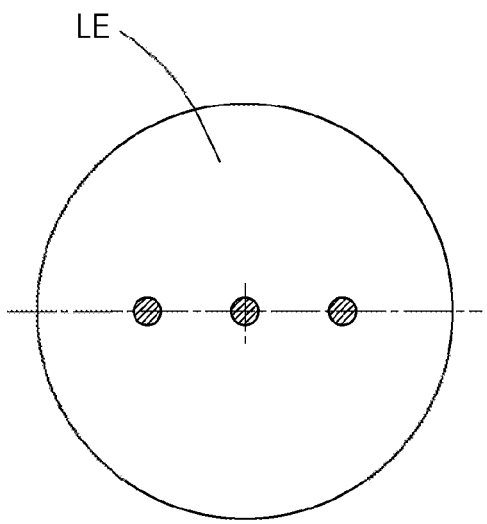
FIG. 14 is a diagram illustrating the eyeglass lens provided with mark points.

In the above example, the marks Mu and Md have been described as the marks printed on the eyeglass lens LE by the manufacturer of the eyeglass lens LE for determining the upper portion and the lower portion of the eyeglass lens LE. However, the marks for determining the upper portion and the lower portion of the eyeglass lens LE are not limited to the marks Mu and Md. For example, as the marks for determining the upper portion and the lower portion of the eyeglass lens LE, marks M1 which are asymmetric with respect to the top and bottom and the left and right may be engraved on the eyeglass lens LE by a laser, as illustrated in FIG. 13A. Further, as the mark for determining the upper portion and the lower portion of the eyeglass lens, a mark M2 including a numeral, a character, or the like may be printed on the eyeglass lens LE. Further, as illustrated in FIG. 13B, the mark for determining the upper portion and the lower portion of the eyeglass lens may be a mark M3 printed on the progressive focal lens LE.

The marks Mu, Md, M1, M2, and M3 for enabling the determination of the upper portion and the lower portion of the eyeglass lens LE may differ depending on the manufacturer of the eyeglass lens LE. Thus, it is difficult to automatically determine the upper portion and the lower portion of the lens LE based on these marks. By providing the eyeglass lens LE with common (unified) mark points according to the present example, the upper portion and the lower portion of the eyeglass lens LE can be automatically and easily determined.

In the present example, the lens meter provided with the point marking mechanism has been described by way of example. The present disclosure may be applied to an eyeglass lens measuring apparatus configured to measure optical properties.

In the present example, the eyeglass lens measuring apparatus provided with the point marking mechanism has been described by way of example. However, this is not a limitation, and the point marking mechanism described with reference to the present example may be configured to be set (mounted) on an eyeglass lens measuring apparatus (such as a lens meter) as a point marking adapter (point marking attachment; point marking apparatus). For example, the point marking adapter that can provide a mark point at an additional one point may be mounted on the lens meter that can provide mark points at three points. In this way, the lens meter can provide the lens LE with the mark point at four points simultaneously. In this case, the point marking adapter may be configured without the point marking members 110a, 110b, and 110c as the first point marking members in the configuration of the point marking mechanism 80 illustrated in FIG. 4. That is, the point marking adapter may be provided with the point marking member (point marking member 110d) for providing the mark point (120d) defining the upper portion and the lower portion of the eyeglass lens, and may be configured to be mounted on the eyeglass lens measuring apparatus.

It is also possible to adopt a modification such that one of the mark points provided by the lens meter that can provide the mark points at three points has a different shape and/or color from the other mark points. In this case, a point marking adapter configured to be mounted on one of the ink pens of the lens meter may be used. Of course, the configuration of the point marking adapter is not limited to the above. The point marking adapter may be configured such that the number, color, shape and the like of the mark points provided by the lens meter can be modified by mounting the point marking adapter on the lens meter.

The point marking adapter may include the point marking mechanism 80, for example. The point marking adapter is mounted on an eyeglass lens measuring apparatus (such as a lens meter) that does not have the point marking mechanism. In this way, the eyeglass lens measuring apparatus can provide the eyeglass lens LE with the mark points for determining the upper portion and the lower portion of the lens LE with different optical properties between the upper portion and the lower portion.

The eyeglass lens measuring apparatus according to the present example may be configured to provide the mark points automatically. For example, the eyeglass lens LE may be automatically transported to the eyeglass lens measuring apparatus by a lens transporter or a robot arm. For example, the control unit 70 detects that the eyeglass lens LE of the eyeglass lens measuring apparatus has been moved. Then, the control unit 70 may be configured to provide the mark points automatically by controlling a driving part of the point marking mechanism (not shown).

The first mark point and the second mark point may be formed in the same arrangement on the eyeglass lens for the right eye and the eyeglass lens for the left eye, with the second mark point of each eyeglass lens enabling the determination of the top and bottom of each eyeglass lens.

The point marking mechanism described with reference to the present example may be configured to be set (mounted) on the eyeglass lens measuring apparatus by a point marking adapter (point marking attachment).

The point marking members 110b and 110c may be disposed to the left and right of the point marking member 110a at the center in a linear manner. The point marking members 111b and 111c may be disposed to the left and right of the point marking member 111a at the center. The point marking members 112b and 112c may be disposed to the left and right of the point marking member 112a at the center. The point marking members 113b and 113c may be disposed to the left and right of the point marking member 113a at the center.

The embodiment of the present disclosure may be expressed as first to third eyeglass lens measuring apparatuses, a first point marking adapter, and a method for distinguishing the top and bottom of the first and second eyeglass lenses as follows:

The first eyeglass lens measuring apparatus is an eyeglass lens measuring apparatus that can successively measure an eyeglass lens for the right eye and an eyeglass lens for the left eye, the apparatus including: a measuring optical system configured to measure optical properties of the eyeglass lens; and a point marking mechanism including a first point marking member configured to provide a first mark point defining an optical center and an astigmatic axis of the eyeglass lens which are acquired by using the measuring optical system, and a second point marking member configured to provide a second mark point defining the top and bottom of the eyeglass lens, the point marking mechanism enabling the first mark point and the second mark point to be simultaneously provided on the eyeglass lens, in which a mark point is formed on the eyeglass lens for the right eye and the eyeglass lens for the left eye in the same arrangement by the point marking mechanism, and in which the top and bottom of each eyeglass lens can be determined by using the second mark point with which each eyeglass lens is provided.

The first method for determining the top and bottom of the eyeglass lens provides the eyeglass lens with the second mark point by using the point marking mechanism of the first eyeglass lens measuring apparatus, and determines the top and bottom of the eyeglass lens by using the second mark point on the eyeglass lens.

The second eyeglass lens measuring apparatus is the first eyeglass lens measuring apparatus in which the second point marking member is provided with a separate point-marking ink pen at a position different from a point-marking ink pen attached to the first point marking member.

The third eyeglass lens measuring apparatus is the first eyeglass lens measuring apparatus in which the second point marking member shares a point-marking ink pen attached to the first point marking member, and in which an ink pen that provides the second mark point is of a different type from another ink pen attached to the first point marking member.

The first point marking adapter is a point marking adapter provided with: a measuring optical system configured to measure optical properties of an eyeglass lens; and a first point marking member configured to provide a first mark point defining an optical center and an astigmatic axis of the eyeglass lens that are acquired by using the measuring optical system, and is installed on an eyeglass lens measuring apparatus that can successively measure an eyeglass lens for the right eye and an eyeglass lens for the left eye, the point marking adapter being further provided with a second point marking member for the providing a second mark point defining the top and bottom of the eyeglass lens. When mounted on the eyeglass lens measuring apparatus, the point marking adapter can provide the first mark point and the second mark point on the eyeglass lens simultaneously. The first mark point and the second mark point are formed on the eyeglass lens for the right eye and the eyeglass lens for the left eye in the same arrangement. The point marking adapter can provide the second mark point enabling the determination of the top and bottom of the eyeglass lens by using the second mark point with which each eyeglass lens is provided.

The second method for determining the top and bottom of the eyeglass lens provides the eyeglass lens with the second mark point by using a point marking mechanism that is used in an eyeglass lens measuring apparatus and that includes a first point marking member configured to provide a first mark point defining an optical center and an astigmatic axis of the eyeglass lens which are acquired by using the measuring optical system, and a second point marking member configured to provide the second mark point defining the top and bottom of the eyeglass lens, the point marking mechanism being enabled to provide the first mark point and the second mark point on the eyeglass lens. The method then determines the top and bottom of the eyeglass lens by using the second mark point on the eyeglass lens.

The foregoing detailed description has been presented for the purposes of illustration and description. Many modifications and variations are possible in light of the above teaching.

It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An eyeglass lens measuring apparatus comprising:
   a measuring optical system configured to measure optical properties of an eyeglass lens for the right eye and optical properties of an eyeglass lens for the left eye; and
   a point marking mechanism including a first point marking member configured to provide a first mark point defining an optical center and an astigmatic axis of the eyeglass lens which are acquired by using the measuring optical system, and a second point marking member configured to provide a second mark point defining an upper portion and a lower portion of the eyeglass lens.

2. A method for distinguishing an upper portion from a lower portion of an eyeglass lens, the method comprising:
   providing the eyeglass lens with the second mark point by using the point marking mechanism of the eyeglass lens measuring apparatus according to claim 1; and
   distinguishing the upper portion from the lower portion of the eyeglass lens by using the second mark point on the eyeglass lens.

3. The eyeglass lens measuring apparatus according to claim 1, wherein the second point marking member is provided, with a separate point-marking ink pen disposed at a position different from a point-marking ink pen attached to the first point marking member.

4. The eyeglass tens measuring apparatus according to claim 1, wherein:
   the second point marking member is configured to share a point-marking ink pen attached to the first point marking member with the first point marking member; and
   the ink pen that provides the second mark point is an ink pen of a type different from another ink pen of the first point marking member.

5. The eyeglass lens measuring apparatus according to claim 1, wherein the point marking mechanism is configured to provide the first mark point and the second mark point on the eyeglass lens simultaneously.

6. A method for distinguishing an upper portion from a lower portion of an eyeglass lens, the method comprising:
   acquiring an optical center and an astigmatic axis of the eyeglass lens;
   providing a first mark point defining the optical center and the astigmatic axis of the eyeglass lens;
   providing a second mark point defining the upper portion and the lower portion of the eyeglass lens; and
   distinguishing the upper portion from the lower portion of the eyeglass lens by using the second mark point.

* * * * *